E. H. CARROLL.
CLUTCH.
APPLICATION FILED JUNE 22, 1908.

1,007,335.

Patented Oct. 31, 1911.

2 SHEETS—SHEET 1.

Witnesses
R. D. Tolman
Penelope Cumberbach.

Inventor
Elbert H. Carroll.
By Rufus B. Fowler
Attorney

E. H. CARROLL.
CLUTCH.
APPLICATION FILED JUNE 22, 1908.

1,007,335.

Patented Oct. 31, 1911.
2 SHEETS—SHEET 2.

Witnesses
A. D. Tolman.
Penelope Comberbach.

Inventor
Elbert H. Carroll.
By Rufus B. Fowler
Attorney

UNITED STATES PATENT OFFICE.

ELBERT H. CARROLL, OF WORCESTER, MASSACHUSETTS, ASSIGNOR TO MORGAN CONSTRUCTION COMPANY, OF WORCESTER, MASSACHUSETTS, A CORPORATION OF MASSACHUSETTS.

CLUTCH.

1,007,335. Specification of Letters Patent. Patented Oct. 31, 1911.

Application filed June 22, 1908. Serial No. 439,728.

*To all whom it may concern:*

Be it known that I, ELBERT H. CARROLL, a citizen of the United States, residing at Worcester, in the county of Worcester and Commonwealth of Massachusetts, have invented a new and useful Improvement in Clutches, of which the following is a specification, accompanied by drawings forming a part of the same, in which—

Figure 1:
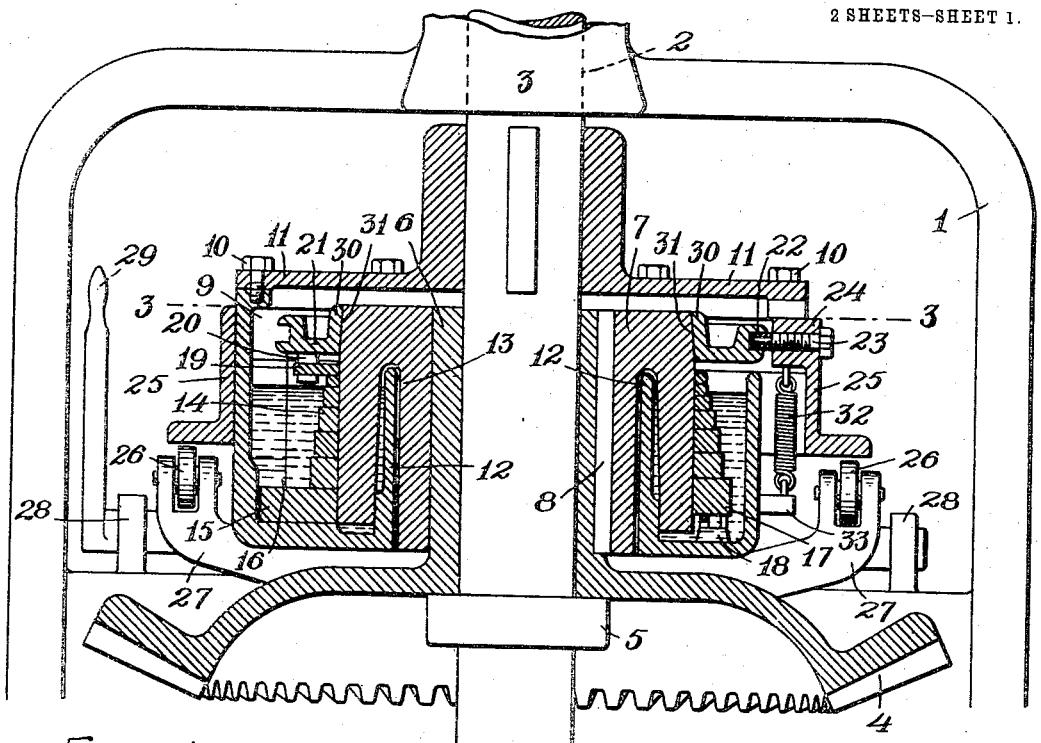
Figure 2:
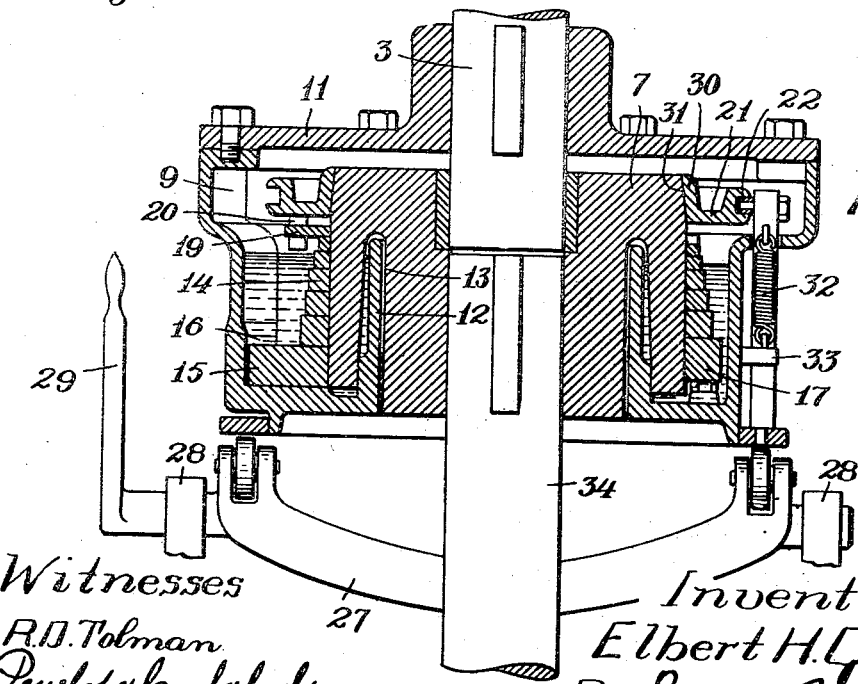
Figure 3:
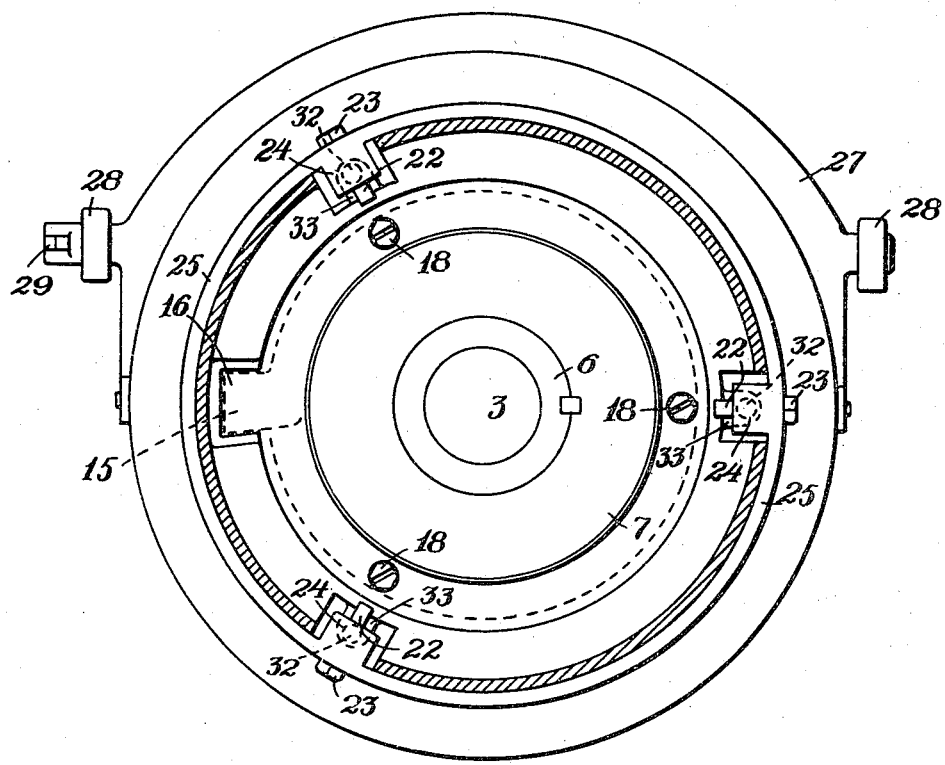

Figure 1 is a central vertical sectional view of my improved clutch. Fig. 2 is the same, showing a modified construction. Fig. 3 is a top view with the cover for the oil receptacle, the friction ring and the spiral spring removed.

Similar reference figures refer to similar parts in the different views.

My invention relates to a clutch, comprising a driving member and a driven member, and means for frictionally connecting said members, thereby imparting the rotation of said driving member to said driven member, said friction means arranged to be actuated at will, and it consists in the construction and arrangement of parts as hereinafter described and pointed out in the annexed claims.

Referring to the accompanying drawings 1 denotes a frame, in which is journaled at 2 a driven shaft 3, loosely mounted upon which is a bevel gear 4, held thereon by a collar 5 and arranged to be engaged by a bevel gear, not shown, upon a driving shaft in the well known manner. Integral with the gear 4 is a sleeve or hub 6 surrounding the shaft 3, and to which an annular driving block 7 is attached by a key 8. Surrounding the driving block 7 is an oil receptacle 9, attached by bolts 10 to a cover 11, which is keyed to the shaft 3. The oil receptacle 9 is annular in shape, with its inner wall 12 inserted in an annular recess 13 in the driving block 7.

Surrounding the block 7 is a loosely wound spiral spring or elastic band 14, with its lower end 15 engaging a recess 16 in the bottom of the oil receptacle 9, its lowest coil 17 preferably supported upon the heads of adjusting screws 18 in the bottom of the oil receptacle 9. The upper end 19 of the band 14 is attached by a pin 20 to a ring 21 supported on rollers 22 on the ends of the bolts 23, thereby capable of a rotary movement concentric with the block 7, in order to compensate for the wear of the contacting parts.

The bolts 23 are held in arms 24, attached to a ring 25 outside of the oil receptacle 9, and supported on rolls 26 held in a yoke 27, journaled in bearings 28 and rocked by a lever handle 29. The ring 21 is provided with a friction surface 30, which is arranged to engage the conical surface 31 upon the driving block 7.

Springs 32 are attached at one end to lugs 33 on the oil receptacle 9, and at the other end to the arms 24, so that when the lever handle 29 is rocked to withdraw the supporting rolls 26 from the arms 24, they are drawn by the springs 32 toward the bottom of the oil receptacle, and carry the surface 30 on the ring 21 into operative engagement with the surface 31 on the block 7, from which the ring 21 receives a rotary movement. The rotation of the ring 21 carries with it the upper end 19 of the band 14, and, as the lower end 15 is held stationary by its engagement with the oil receptacle 9, the frictional contact of the band with the driving block 7 is gradually tightened. In this manner rotary movement is gradually imparted to the band 14, then to the oil receptacle 9, and through the cover 11 to the shaft 3. In order to break the connection and stop the shaft 3, the lever handle 29 is rocked to raise the roll 26, thereby lifting the ring 21 from out of frictional contact with the driving block 7; the band 14 is thereby loosened and the driving block 7 rotates freely within the band 14, without imparting rotation thereto. The screws 18 may be reached to be adjusted in order to maintain the correct position of the band 14, by removal of the ring 21 and the band 14, as shown in Fig. 3.

In Fig. 2 I have shown my improved clutch used to connect a driving and a driven shaft with their axes parallel. In that figure the driving block 7 is keyed to the driving shaft 34, and the driving block 7 is provided with a recess 35 to receive the end of the driven shaft 3, to which is keyed the cover 11 as already described. I have also shown in Fig. 2 an alternative method of arrangement of the ring 25 and arms 24 to support the friction ring 21.

I claim,

1. A clutch having driving and driven members, one of said members consisting of a hub, means for rotating said hub, a band inclosing said hub, in engagement with said other member, means for causing the frictional engagement of said band on said hub and means for adjusting said band in a direction parallel with the axis of said hub.

2. A clutch having driving and driven members, one of said members consisting of a hub, means for rotating said hub, with the outer surface of said hub parallel with its axis of rotation, a band inclosing said hub concentric therewith, with one end in engagement with the other member, means for causing the frictional engagement of said band on said hub, and means for adjusting said band in a direction parallel with said axis of rotation.

3. A clutch having driving and driven members, consisting of a hub and an oil receptacle, said hub extending into said oil receptacle, a friction ring arranged to contact with a friction surface on said hub, a band surrounding said hub with one end in engagement with said oil receptacle and the other end attached to said ring, and means for rotating said driving member.

4. A clutch having driving and driven members, consisting of a hub and an oil receptacle, said hub extending into said oil receptacle, a band surrounding said hub with one end in engagement with said oil receptacle, a friction ring rotatively supported from said oil receptacle arranged to contact with a friction surface on said hub, with the other end of said band attached to said friction ring, and means for rotating said driving member.

5. A clutch having driving and driven members, consisting of a hub and an oil receptacle, said hub extending into said oil receptacle, said hub having a conical friction surface at one end, a friction ring arranged to contact with said friction surface, a band surrounding said hub with one end in engagement with said oil receptacle and the other end attached to said ring, means for raising and lowering said ring to connect and disconnect said band and hub, and means for rotating said driving member.

6. A clutch, comprising a friction hub forming the driving member and having an annular recess, an annular oil receptacle forming the driven member and having its inner wall inclosed in the recess of the driving hub, and a friction mechanism for operatively connecting said driving and said driven member.

7. A clutch, comprising a friction hub forming the driving member and having an annular recess, an annular oil receptacle forming the driven member and having its inner wall inclosed in said recess, friction mechanism operatively connecting said driving and said driven members, and a shaft attached to said driven member.

8. In a friction clutch, the combination of a driving member, consisting of a rotating friction hub having a vertical axis and provided at its upper end with a tapering surface, a friction ring adapted to engage said tapered surface, an oil receptacle inclosing said friction ring and said driving hub, a spiral spring inclosing said driving hub, said spring being connected at one end with said oil receptacle and at its opposite end with said friction ring, means for imparting rotary motion from said oil receptacle, and means for moving said friction ring out of engagement with said driving hub.

Dated this 17th day of June, 1908.

ELBERT H. CARROLL.

Witnesses:
PENELOPE COMBERBACH,
RUFUS B. FOWLER.